US009632672B2

United States Patent
Gnezdov et al.

(10) Patent No.: US 9,632,672 B2
(45) Date of Patent: Apr. 25, 2017

(54) INTERFACE FOR CLUSTERED UTILITY NODES

(71) Applicant: Itron, Inc., Liberty Lake, WA (US)

(72) Inventors: Sergei Aleksandrovich Gnezdov, Spokane Valley, WA (US); Anthony Scott Smith, Liberty Lake, WA (US)

(73) Assignee: Itron, Inc., Liberty Lake, WA (US)

( * ) Notice: Subject to any disclaimer, the term of this patent is extended or adjusted under 35 U.S.C. 154(b) by 297 days.

(21) Appl. No.: 13/928,672

(22) Filed: Jun. 27, 2013

(65) Prior Publication Data

US 2014/0047372 A1 Feb. 13, 2014

Related U.S. Application Data

(60) Provisional application No. 61/681,508, filed on Aug. 9, 2012.

(51) Int. Cl.
*G06Q 10/06* (2012.01)
*G06F 3/0484* (2013.01)
(Continued)

(52) U.S. Cl.
CPC ..... *G06F 3/04842* (2013.01); *G06Q 10/0631* (2013.01); *G06Q 50/06* (2013.01);
(Continued)

(58) Field of Classification Search
CPC ......... H04L 45/02; H04L 45/12; H04L 45/46; H04L 45/54; H04L 45/64; H04L 45/126;
(Continued)

(56) References Cited

U.S. PATENT DOCUMENTS 6,904,361 B1 * 6/2005 Tallman ............ G06F 17/30241
340/870.2
7,283,062 B2 10/2007 Hoiness et al.
(Continued)

OTHER PUBLICATIONS

Survalent Technology, System Configuration Status (SCS), Aug. 26, 2010, published by Survalent Technology Corporation, Ontario, Canada, www.survalent.com, Brochure accessed Dec. 1, 2016 from: http://web.archive.org/web/20120318210239/http://www.survalent.com/images/pdfs/scs.pdf, 1 page.*
(Continued)

*Primary Examiner* — Doon Chow
*Assistant Examiner* — Wendy Nicholas
(74) *Attorney, Agent, or Firm* — Lee & Hayes, PLLC

(57) ABSTRACT

Techniques for navigating a user interface and for selecting a utility node from within a cluster of utility nodes are described herein. The user interface may display an icon representing the cluster of utility nodes. A selection (e.g., made by a user) of the icon may be received and a list of the utility nodes that are represented by the icon may be displayed. Selection of a particular utility node from the list may be received, and an action may be performed on the selected utility node. The action may include displaying utility information associated with the utility node, zooming in on the utility node, and/or receiving information from an individual with which to configure the utility node.

12 Claims, 7 Drawing Sheets

(51) Int. Cl.
*H04L 12/24* (2006.01)
*G06Q 50/06* (2012.01)
*H04L 12/12* (2006.01)
*G06F 3/0481* (2013.01)

(52) U.S. Cl.
CPC .......... *H04L 41/22* (2013.01); *G06F 3/04817* (2013.01); *H04L 12/12* (2013.01)

(58) Field of Classification Search
CPC ... H04L 67/18; H04L 67/104; H04L 67/1065; G06F 9/5077; G01D 4/006; G06Q 50/06; H04Q 2209/50; H04Q 2209/60; H04Q 9/00
USPC ............... 715/771, 772; 340/870.01, 870.02; 370/235, 328, 400, 468; 705/412; 709/220, 223, 224, 225, 226, 229, 238, 709/239, 240, 241
See application file for complete search history.

(56) References Cited

U.S. PATENT DOCUMENTS

| | | | | |
|---|---|---|---|---|
| 7,304,587 B2 * | 12/2007 | Boaz | ........................ | H04Q 9/00 340/870.02 |
| 7,788,400 B2 | 8/2010 | Tang et al. | | |
| 7,827,279 B2 | 11/2010 | Xu et al. | | |
| 8,555,203 B1 * | 10/2013 | Jin et al. | ........................ | 715/835 |
| 8,671,355 B2 * | 3/2014 | Pegg | ................ | G01C 21/3682 715/765 |
| 8,970,349 B2 * | 3/2015 | Gutierrez et al. | ............. | 340/8.1 |
| 2002/0024535 A1 * | 2/2002 | Ueno | ................. | H04L 12/2602 715/736 |
| 2002/0130906 A1 * | 9/2002 | Miyaki | ........................ | 345/837 |
| 2004/0172466 A1 * | 9/2004 | Douglas | .............. | H04L 12/2602 709/224 |
| 2004/0236620 A1 * | 11/2004 | Chauhan et al. | .................. | 705/9 |
| 2005/0251331 A1 * | 11/2005 | Kreft | ........................ | G01C 3/08 701/438 |
| 2006/0022841 A1 * | 2/2006 | Hoiness | ................. | G01D 4/006 340/870.02 |
| 2006/0129667 A1 | 6/2006 | Anderson | | |
| 2006/0135119 A1 * | 6/2006 | Kumar | ................. | H04M 11/002 455/405 |
| 2006/0268770 A1 | 11/2006 | Spiess | | |
| 2009/0100363 A1 | 4/2009 | Pegg et al. | | |
| 2009/0110302 A1 | 4/2009 | Snow | | |
| 2010/0088631 A1 * | 4/2010 | Schiller | ................. | G06F 3/0481 715/784 |
| 2010/0289652 A1 * | 11/2010 | Javey | ....................... | H04Q 9/00 340/605 |
| 2011/0010650 A1 | 1/2011 | Hess et al. | | |
| 2011/0047509 A1 * | 2/2011 | Arrasvuori | ......... | G01C 21/3673 715/815 |
| 2011/0265030 A1 * | 10/2011 | Lin et al. | ....................... | 715/790 |
| 2011/0279229 A1 * | 11/2011 | Nielsen | ............. | G06F 17/30241 340/8.1 |
| 2014/0028468 A1 * | 1/2014 | Grady | .................... | G08C 15/00 340/870.03 |
| 2014/0052763 A1 * | 2/2014 | Sato et al. | .................... | 707/805 |

OTHER PUBLICATIONS

The PCT Search Report and Written Opinion mailed Oct. 1, 2013 for PCT application No. PCT/US13/48182, 11 pages.

Burigat, et al., "Decluttering of Icons Based on Aggregation in Mobile Maps", Jan. 1, 2008, Map-Based Mobile Services: Design, Interaction and Usability; [Lecture Notes in Geoinformation and Cartography], pp. 1-21.

The Extended European Search Report mailed Dec. 1, 2015 for European patent application No. 13828158.9, 11 pages.

* cited by examiner

INTERFACE FOR CLUSTERED UTILITY NODES

CROSS REFERENCE TO RELATED APPLICATIONS

The application claims the benefit of U.S. Provisional Application No. 61/681,508, filed Aug. 9, 2012, which is incorporated herein by reference.

BACKGROUND

A utility company may utilize hundreds of thousands or millions of networked utility nodes, such as utility meters, cellular relays, transformers, repeaters, and/or other nodes. These nodes are typically able to receive data from neighboring nodes and relay the data to other neighboring nodes until the data reaches a central office of the utility company.

A customer, network administrator, or other individual may view information associated with the nodes through an interface. The interface may display a map with icons corresponding to the nodes. However, due to a large number of nodes, it may be difficult to navigate to a particular node on the interface. For example, when nodes are located at or nearby a same location, the nodes may be displayed with a single icon. This limits the ability of an individual to select a particular node.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
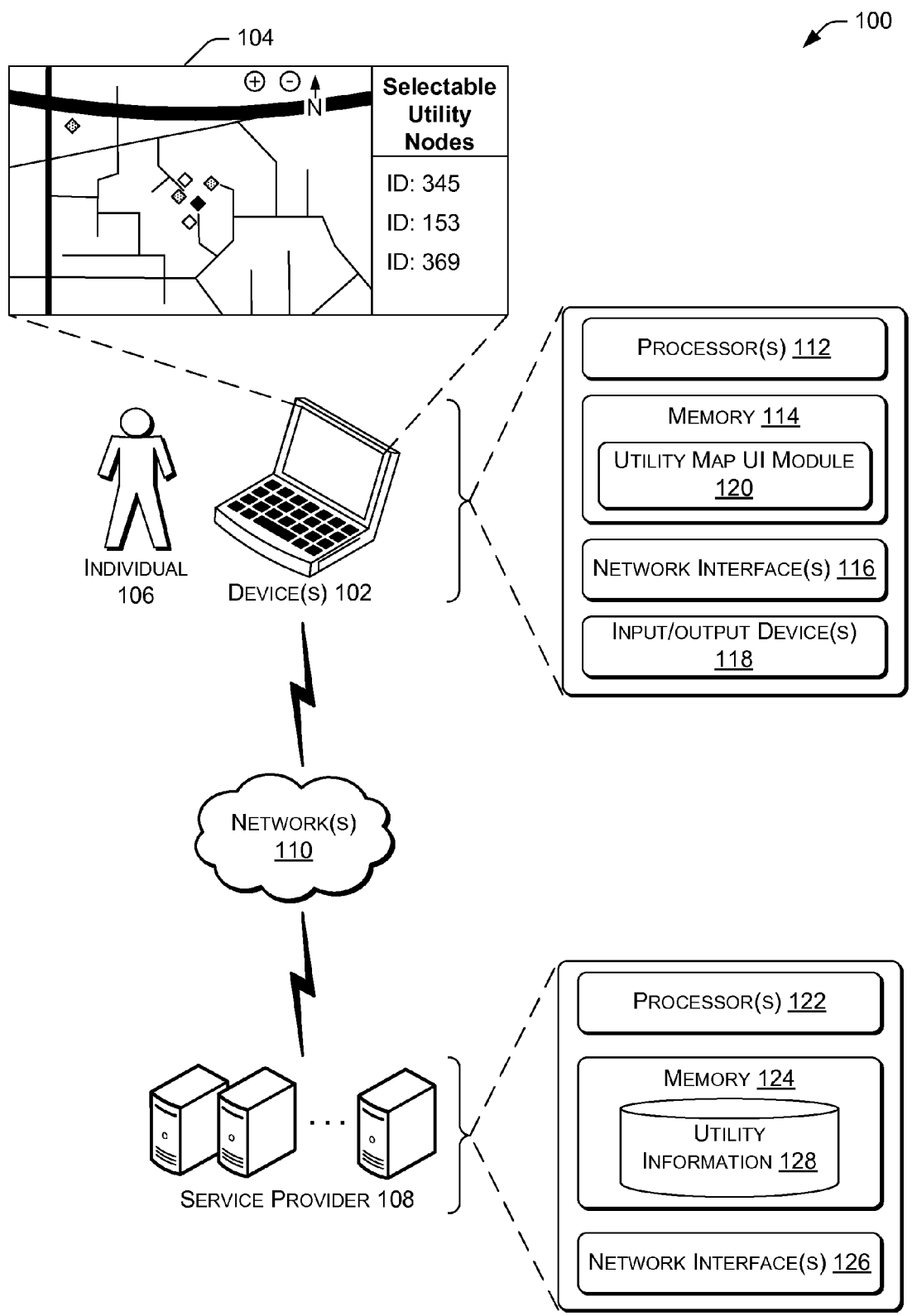
FIG. 1 illustrates an example architecture to navigate to a utility node associated with a cluster of utility nodes.

As discussed above, utility companies often utilize hundreds of thousands or millions of networked utility nodes. Such utility nodes may be integral or associated with utility meters, cellular relays, transformers, repeaters, and/or other nodes in a utility communication network (e.g., an advanced metering infrastructure (AMI)).

A utility engineer or technician, network administrator, or other individual may view information associated with these numerous nodes through a user interface, which up to this point has provided limited navigation capabilities. For example, when nodes are located at a same location or in close proximity to one another, the nodes are displayed with a single icon. This may require an individual to manually zoom in on the icon to gain access to an icon associated with a particular node. Further, in some instances the particular node may be inaccessible, even after zooming in on the icon. Consequently, an individual may spend a substantial amount of time navigating in the interface and in some instances a node may still be inaccessible.

This disclosure describes techniques for providing a user interface and for navigating to a desired utility node that is located adjacent to one or more other utility nodes, which may be arranged in a cluster, group or crowded formation. For instance, an interface may display a map with an icon that represents clustered utility nodes. Each of the utility nodes may correspond to and/or be located at a smart utility meter (e.g., electric, gas, and/or water meter), a sensor, a control point, a server, a relay, a router, a transformer, a repeater, a switch, a valve, or another network device. Through the interface an individual may select the icon, causing a list of the clustered utility nodes to appear. The list may enable the individual to view utility nodes that are associated with the icon. Further, upon selection of a utility node in the list, an action may be performed to enable the individual to navigate to the utility node or otherwise access the utility node.

In some instances, the action includes displaying utility information associated with the selected utility node. For example, the interface may be updated with operation information indicating how the utility node is operating (e.g., a status), resource consumption information related to consumption of a resource (e.g., water, gas, and/or electricity) associated with the utility node, billing information related to fees for a resource, identification information of the utility node, location information of the utility node, and so on. Further, in some instances the action includes zooming in on the utility node and/or receiving information from an individual to configure the utility node.

By providing a list of clustered utility nodes that are associated with an icon, an individual may navigate to (e.g., access) a particular node of the clustered nodes without having to manually zoom in on the particular node. This may reduce an amount of time an individual spends navigating in the interface (e.g., zooming in/out) to access the particular node. In addition, the list of clustered utility nodes may allow an individual to access all nodes associated with an icon, including nodes that may have previously been inaccessible (e.g., if a cluster of nodes are all associated with a same location). Further, by providing the list of clustered utility nodes, an individual's experience with the interface may be enhanced.

This brief introduction is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. It is to be appreciated, however, that the following implementation and context is but one of many.

Example Architecture

FIG. 1 illustrates an example architecture 100 in which techniques described herein may be implemented. The architecture 100 includes one or more devices 102 (hereinafter the device 102) configured to generate and/or output (e.g., display) an interface 104 to an individual 106. The device 102 may also be configured to communicate with a service provider 108 via one or more networks 110. The individual 106 may include a network administrator associated with a utility company, an individual associated with servicing nodes of the network (e.g., repair or install technician), customer service representative, or any other individual.

The interface 104 may display icons (e.g., visual representations) that each correspond to one or more utility nodes. A utility node may be configured as or disposed at a smart utility meter (e.g., electric, gas, and/or water meter), a sensor, a control point, a server, a relay (e.g., cellular relay), a router, a transformer, a repeater (e.g., configured to relay data), a switch, a valve, or another network device. In some instances, a utility node is referred to as a data collector (e.g., server, smart transformer, relay, router, etc.), an endpoint (e.g., smart utility meter, sensor, control point, etc.), a repeater, or another generalized term. A data collector may generally collect data (e.g., resource consumption information, etc.) from one or more endpoints and send the data to a central office (e.g., server) of a utility company, directly or through other network devices. A repeater may generally relay information between utility nodes.

The utility nodes may form a network in which nodes communicate over one or more communication channels (e.g., a "spectrum" of channels). In some instances, this may enable utility nodes to communicate without interfering with each other. The one or more communication channels may utilize a spectrum of radio frequencies (RF) or a wired medium. A wired medium may include dedicated wiring, or may include power line communication (PLC), i.e., a data signal superimposed over an alternating current (AC) power distribution line. In some instances, the nodes are configured as an advanced metering infrastructure (AMI) for automated meter reading (AMR).

The device 102 may be equipped with one or more processors 112, memory 114, one or more network interfaces 116, and one or more input/output devices 118. The one or more network interfaces 116 may enable the device 102 to communicate over the one or more networks 110 and/or other networks. The one or more input/output devices 118 may include a mouse, a touch screen, a keyboard, a monitor, a stylus, a sensor, a speaker, and/or another device capable of receiving input or outputting information.

The memory 114 may include one or more devices containing processor-readable instructions, which when executed by the one or more processors 112 perform functions that may include some or all of the techniques and/or functionality described herein. In a further example, the functionality of the one or more processors 112 and processor-executable instructions defined in the memory 114 may be performed by a hardware device, such as an application specific integrated circuit (ASIC), a gate array or other hardware-based logic device.

The memory 114 may include software functionality configured as one or more "modules." However, the modules are intended to represent example divisions of the software for purposes of discussion, and are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

In the example device 102, the memory 114 may include a utility map user interface (UI) module 120 configured to perform various functionality associated with the interface 104. For example, the utility map UI module 120 may generate information for displaying the interface 104 and/or provide that information to be output on a screen associated with the device 102. In some instances, the utility map UI module 120 obtains information from the service provider 108, such as utility information described herein. The utility map UI module 120 may also receive input (e.g., for selection of displayed information) through the one or more input/output devices 118 and/or perform operations based on the input.

Although functions of the utility map UI module 120 are illustrated in FIG. 1 as being performed at the device 102, in some instances some or all of the functions of the utility map UI module 120 are performed at the service provider 108 and/or another computing device. In one example, the utility map UI module 120 is configured in a cloud computing environment or data center in which the functionality of the interface 104 is implemented at a remote location to the device 102 and the device 102 receives information utilized to display the interface 104.

The service provider 108 may be equipped with one or more processors 122, memory 124, and/or one or more network interfaces 126. The one or more network interfaces 126 may enable the service provider 108 to communicate over the one or more networks 110 and/or other networks. In some instances, the service provider 108 is configured as a resource in a cloud computing environment or data center. Further, in some instances the service provider 108 comprises or is associated with a central office of a utility company.

The memory 124 may include a data store for storing utility information 128. The utility information 128 may be maintained at the service provider 108 for retrieval by applications, devices, individuals, and so on. For example, the utility information 128 may be provided to the device 102 to be displayed or otherwise used in association with the interface 104. Here, the utility information 128 may be provided upon a request from the utility map UI module 120 for the information. Alternatively, in some instances the utility information 128 may be maintained (e.g., stored) at the device 102.

The utility information 128 may generally include information related to utility nodes of a network. A few examples of utility information include:

Operational information indicating how a utility node is operating. This information may include an operational status (e.g., operating normally, needs attention due to an error), details of an error that has occurred at a utility node (e.g., loss of communication over a predetermined time period, etc.), a communication strength of a utility node with another utility node, a read time (e.g., last read time, all read times, etc.), and so on.

Resource consumption information related to consumption of a resource, such as water, gas, or electricity. For example, the resource consumption information may indicate an amount of water, gas, or electricity that has been consumed (e.g., monthly/weekly consumption amounts). In some instances, the resource consumption information includes details of an error, such as loss of consumption information, lack of consumption information for a predetermined time period, etc.

Billing information related to fees for consuming a resource. The billing information may include payments that have been made, payments due, payments overdue, interest charged, consumption costs (e.g., monthly/weekly consumption costs), etc.

Identification information indicating an identity of a utility node (e.g., an ID specific to a utility node), a type of a utility node (e.g., water, gas, or electricity), version (e.g., first generation device), and so on. In some instances, the identification information indicates whether the node is an endpoint, collector, or repeater.

Location information indicating a location of a utility node (e.g., street address, network address, latitude and longitude, etc.) and/or a corresponding source location where utility information originated.

The memory 114 and/or 124 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves. That is, the computer-readable media includes non-transitory computer-readable media.

The device 102 and/or the service provider 108 may be implemented as one or more computing devices, such as a server(s), a personal computer(s), a laptop computer(s), a smart phone(s), an electronic reader device(s), a mobile handset(s), a personal digital assistant(s) (PDA), a portable navigation device(s), a portable gaming device(s), a tablet computer(s), a watch(s), a portable media player(s), another client device(s), and the like.

As noted above, the device 102 and the service provider 108 may communicate via the one or more networks 110. The one or more networks 110 may include any one or combination of multiple different types of networks, such as cellular networks, wireless networks, Local Area Networks (LANs), Wide Area Networks (WANs), and the Internet.

Illustrative Interfaces

Figure 2A:
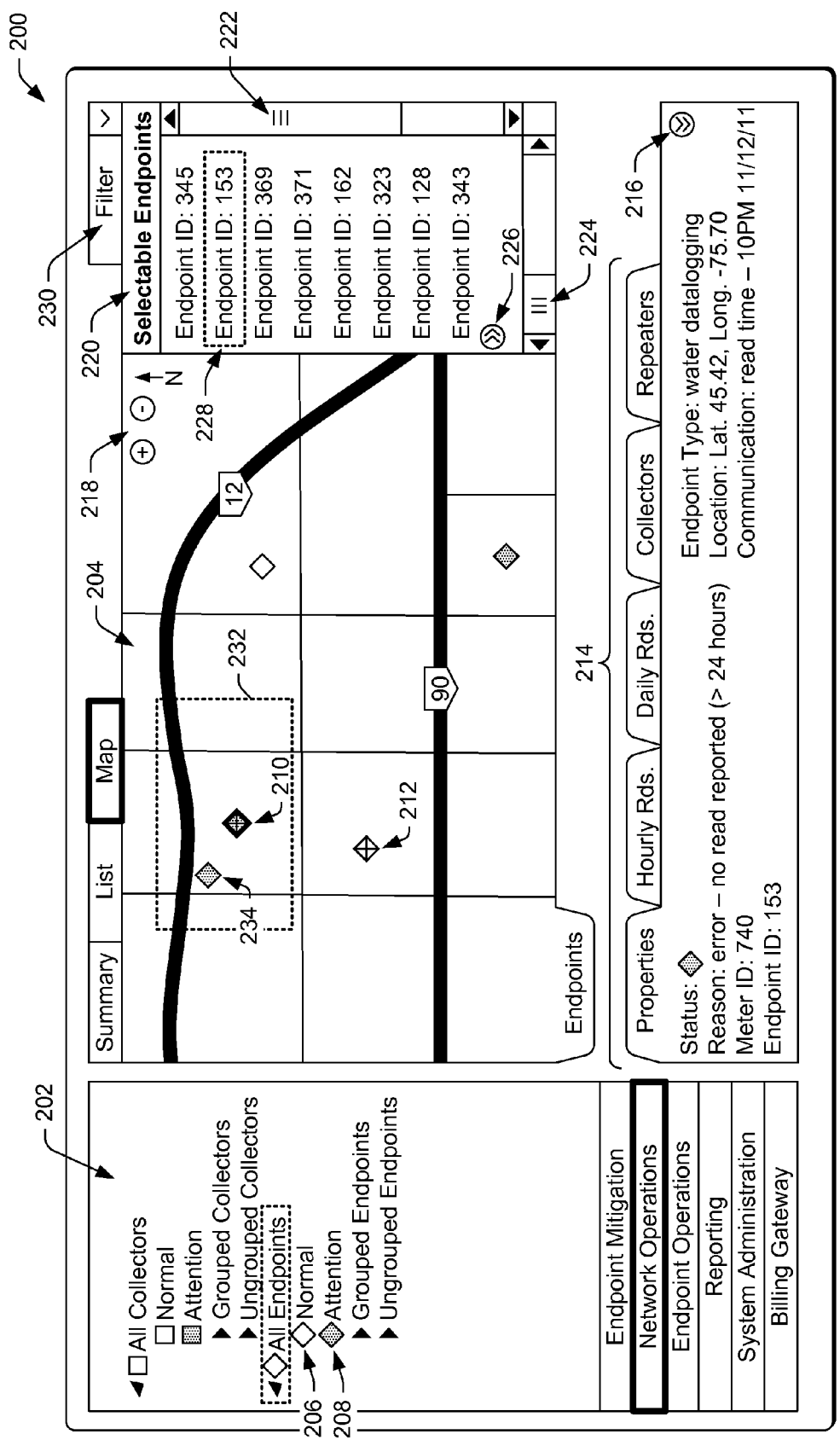
FIGS. 2A-2B illustrate example user interfaces to navigate to a utility node a cluster of utility nodes that are represented with a single icon.
Figure 2B:
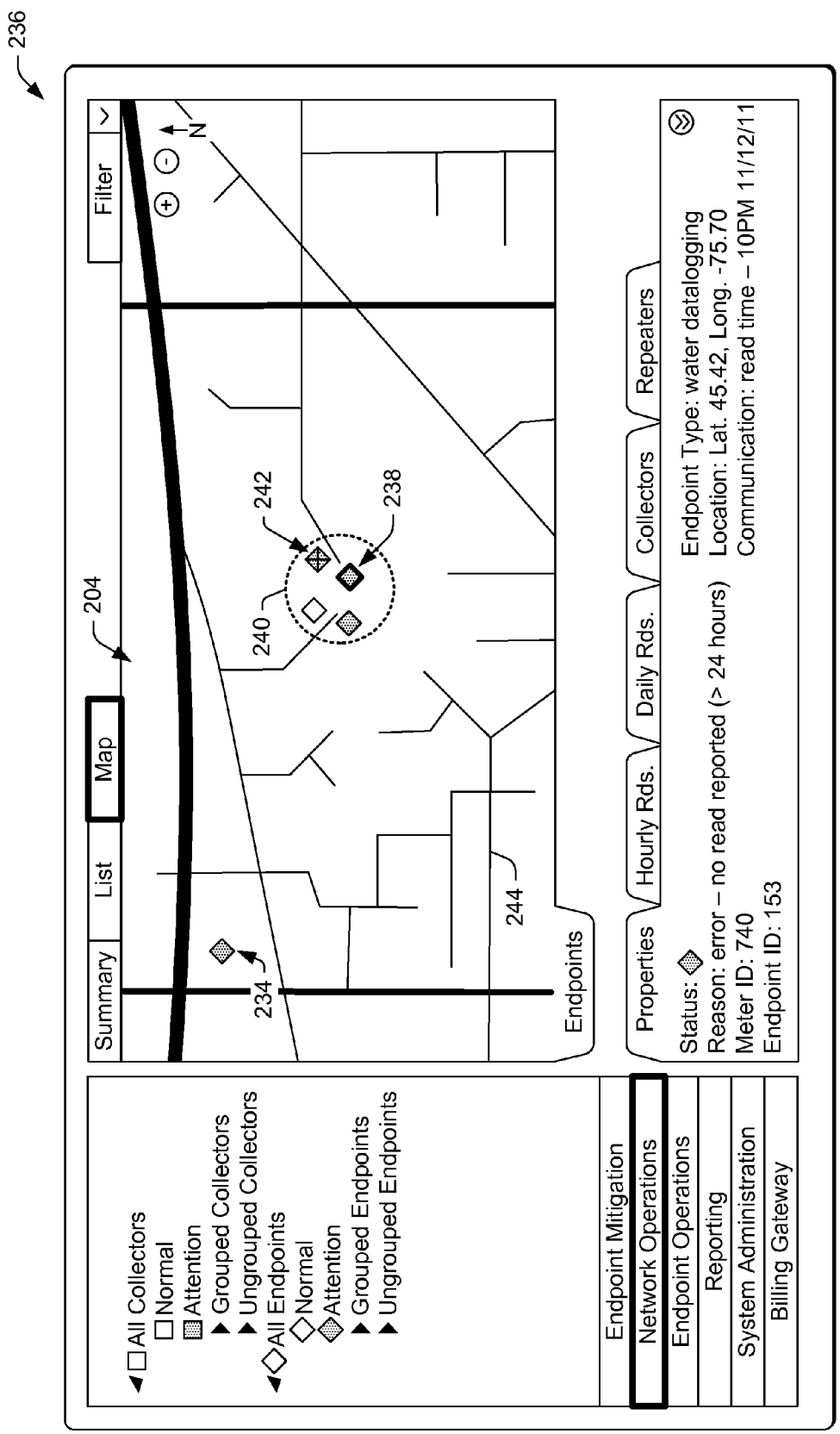
Figure 3:
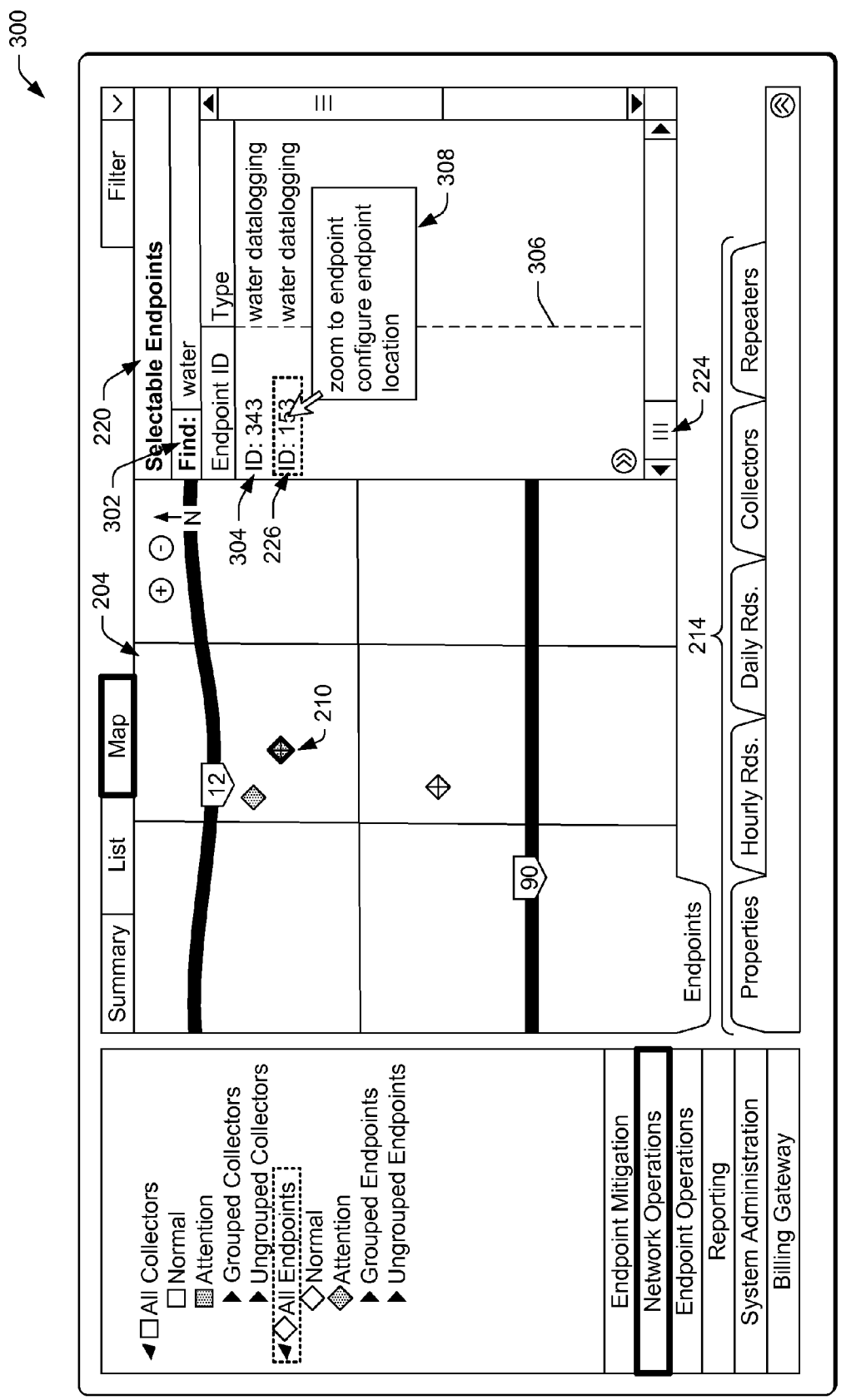
FIG. 3 illustrates an example user interface to search through a cluster of utility nodes that are associated with a selected icon.

FIGS. 2-4 illustrate example interfaces to perform various functions described herein. For ease of illustration these example interfaces are described as being displayed on the device 102 of FIG. 1. However, it should be appreciated that these interfaces may be displayed through other devices.

FIG. 2A illustrates an example interface 200 for navigating to a utility node within a cluster of utility nodes that are presented with a single icon. The interface 200 may include a navigation area 202 for navigating through various utility nodes that may be displayed in an area 204. Here, the navigation area 202 shows various options to navigate to nodes categorized as collectors and endpoints. However, it should be appreciated that the navigation area 202 (and corresponding area 204) may illustrate nodes that are categorized differently (e.g., smart utility meters, sensors, control points, servers, relays, routers, transformers, repeaters, switches, valves, etc.). In one example, the navigation area 202 (and corresponding area 204) illustrates nodes based on a type of resource associated with each of the nodes (e.g., water, gas, or electricity).

As noted above, the utility nodes options in the navigation area 202 may enable an individual to view nodes of a particular category. For example, upon selecting "Normal" 206, the area 204 may display endpoints that are operating normally (e.g., status is set to normal). Alternatively, upon selecting "Attention" 208 the area 204 may display endpoints that need attention due to an error (e.g., status is set to attention, error, etc.). In the example interface 200, an individual has selected "All Endpoints," and the area 204 has been updated to include icons for all endpoints in the network, where the network may include endpoints for a particular geographical region or all geographical regions. In some instances, the number of endpoints displayed in the area 204 may be limited to a predetermined number (e.g., a "maximum" number) of endpoints at a given time, which may be set by a utility, in order to optimize performance of the interface 200. In one example, the predetermined number is set to 10,000.

An icon displayed in the area 204 may include particular symbols, text, etc. indicating information for one or more utility nodes associated with the icon. For example, if an icon is associated with multiple endpoints (e.g., a group of endpoints), then the icon may be displayed with a "+" symbol or other information, such as icons 210 and 212, indicating that the icon is associated with more than one endpoint. Further, an icon may indicate whether or not one or more utility nodes associated with the icon need attention (e.g., due to an error related to the utility node). For example, the icon 210 includes stippling to indicate that the icon 210 is associated with at least one utility node that needs attention.

The interface 200 also includes tabs 214 for presenting information related to the utility nodes that are displayed in the area 204. In the example interface 200, the tabs 214 include a "Properties" tab, an "Hourly Readings" tab, a "Daily Readings" tab, a "Collectors" tab, and a "Repeaters" tab. However, it should be appreciated that other tabs may be included and/or that one or more of these tabs may be removed from the interface 200. Here, the "Properties" tab has been selected to display various information, such as a status of a selected endpoint, a reason for an error, a meter ID, an endpoint ID, an endpoint type, a location of the endpoint, a last read time of the endpoint, etc. In some instances, the tabs 214 may be configured based on a type of utility node that is presented in the area 204. For example, when the area 204 displays endpoints, the tabs 214 may include information specific to endpoints. The tabs 214 also include an icon 216 to minimize or maximize the tabs 214.

The area 204 displays a map, list, or summary for the utility nodes that have been selected in the navigation area 202. For example, the area 204 may display a map, such as a road map, elevation map, weather map, terrain map, satellite map, traffic map, utility line distribution map (e.g., showing gas, water, or electricity distribution pipes or channels), and so on. As illustrated, the area 204 shows a geographic map including roads. The area 204 may also include zoom tools 218 for zooming in and out in the area 204.

The interface 200 also includes a window 220 for displaying a list of utility nodes that are associated with an icon (e.g., selectable endpoints). As illustrated, the window 220 includes a list of endpoints that are represented by the icon 210. Because the endpoints are located at a same location on the map, due to a current zoom level of the map, a single icon 210 is used to represent the endpoints. The window 220 may include scroll bars 222 and 224 to navigate through the endpoints that are displayed in the window 220. Further, the window 220 includes an icon 226 for minimizing or maximizing the window 220. In some instances, the window 220 is displayed in response to selection of an icon that is associated with multiple endpoints (e.g., the icon 210), while in other instances the window 220 is maintained in an overlaid manner over the map.

Although the window 220 is illustrated as being located on the right side of the interface 200, the window 220 may be located anywhere within the interface 200, such as to the left, top, bottom, middle, etc. Further, although the window 220 is illustrated in the interface 200 as being located over a portion of the map, the window 220 may alternatively encompass an entirety of the map and/or be implemented through a tab (e.g., similar to the "Endpoints" tab which displays the map). In some instances, this may allow an individual to view more utility nodes that may be associated with a particular icon.

In the example interface 200, an individual has selected the icon 210 and the window 220 is displayed with endpoints associated with the icon 210. Here, the individual has also selected an endpoint 228 from the window 220, and the "Properties" tab was updated to reflect information for the endpoint 228. One or more of the other tabs 214 may also be updated with information specific to the endpoint 228. In some instances, if one or more of the tabs 214 are minimized, selection of the endpoint 228 may cause one or more of the tabs 214 to be "deminimized" (as illustrated in FIG. 2A, cause a tab to be expanded into a larger representation) or maximized.

By displaying a window including a list of utility nodes associated with an icon that represents clustered utility nodes, an individual is able to navigate to an endpoint that may not have otherwise been accessible. For example, in FIG. 2A the individual was able to navigate to the endpoint 228 (one of multiple endpoints of the icon 210) without having to use the navigation tools 218. In many instances, this may enable the individual to navigate to the endpoint 228 more quickly and enhance an individual's experience with the interface 200. Further, in FIG. 2A the individual is able to navigate to (e.g., view, access, or utilize) any of the endpoints associated with the icon 210 through the list of utility nodes.

The example interface 200 also includes a filter 230 to filter utility nodes (e.g., endpoints) that may be presented in the area 204. For example, the filter 230 may enable an individual to view endpoints (e.g., in the area 204) that are associated with a particular type of utility information (e.g., utility nodes that have not reported consumption information during a predetermined time period, etc.). In this example, the filter 230 is implemented with a drop-down menu, although other known techniques may alternatively be used.

In some instances, selection of a utility node may cause the area 204 to zoom in/out (e.g., automatically zoom). For example, upon selection of the endpoint 228 (e.g., the text "Endpoint ID: 153") in the window 220 of FIG. 2A, the area 204 may zoom in to a region 232 which is centered on the endpoint 228. As illustrated, the region 232 also includes an icon 234 associated with an endpoint. By zooming in on a selected endpoint, an individual may view the endpoint at a more granular level on the map.

FIG. 2B illustrates an example interface 236 that may be displayed upon selection of "Endpoint ID: 153" in FIG. 2A (e.g., text associated with the endpoint 228). In particular, the area 204 of FIG. 2B has been updated to be substantially centered on an icon 238 associated with the endpoint 228. In the area 204, a region 240 shows icons for endpoints that are associated with the icon 210 of FIG. 2A. The region 240 includes an icon 242 associated with multiple endpoints (e.g., endpoints of an apartment complex or building having multiple units). In the interface 236, the "Properties" tab displays information for the endpoint 228, which may be automatically selected upon updating the area 204.

As noted above, the map (displayed in the area 204) may be one of various types of maps. In one example, the map is a utility line distribution map that shows gas, water, or electricity distribution pipes or channels. For example, in reference to FIG. 2B, lines 244 (including the thinner lines and the thicker lines) may correspond to distribution pipes or channels that are used for gas, water, or electricity.

FIG. 3 illustrates an example interface 300 to search through endpoints that are displayed in the area 204 (e.g., map area). In particular, the window 220 includes a search area 302 to receive user input and to perform a term-based search on the endpoints in the area 204. Within area 204, an individual has selected the icon 210 and has performed a search through endpoints of the icon 210 that are associated with the term "water." Out of the eight endpoints that are associated with the icon 210 (see endpoints displayed in the window 220 of FIG. 2A), two endpoints are associated with the term "water" and displayed in the search results, the endpoint 226 and an endpoint 304 (endpoints configured for water datalogging). As illustrated, the "Endpoint ID" of an endpoint is separated from the "Type" by an adjustable vertical line 306. By using the scroll bar 224, an individual may view information for other categories of the endpoints, such as a status, meter ID, location, or other utility information. Further, by selecting (e.g., clicking on) a column header (e.g., "Endpoint ID" or "Type") the endpoints of the search results may be sorted/ordered in ascending or descending order.

In the interface 300, an individual may select (e.g., by right/left clicking on mouse or otherwise) an endpoint of the search results. Upon selecting the endpoint 226, a window 308 is displayed enabling the individual to perform an action, such as zooming in to the endpoint 226, configuring the endpoint 226 (e.g., receiving information to configure the endpoint 226), or displaying location information for the endpoint 226. However, it should be appreciated that the window 308 may enable the individual to perform other actions. In some instances, one or more of these actions may be performed through the tabs 214. For example, upon selecting "location" in the window 308, the "Properties" tab may be maximized and display location information for the endpoint 226.

Figure 4A:
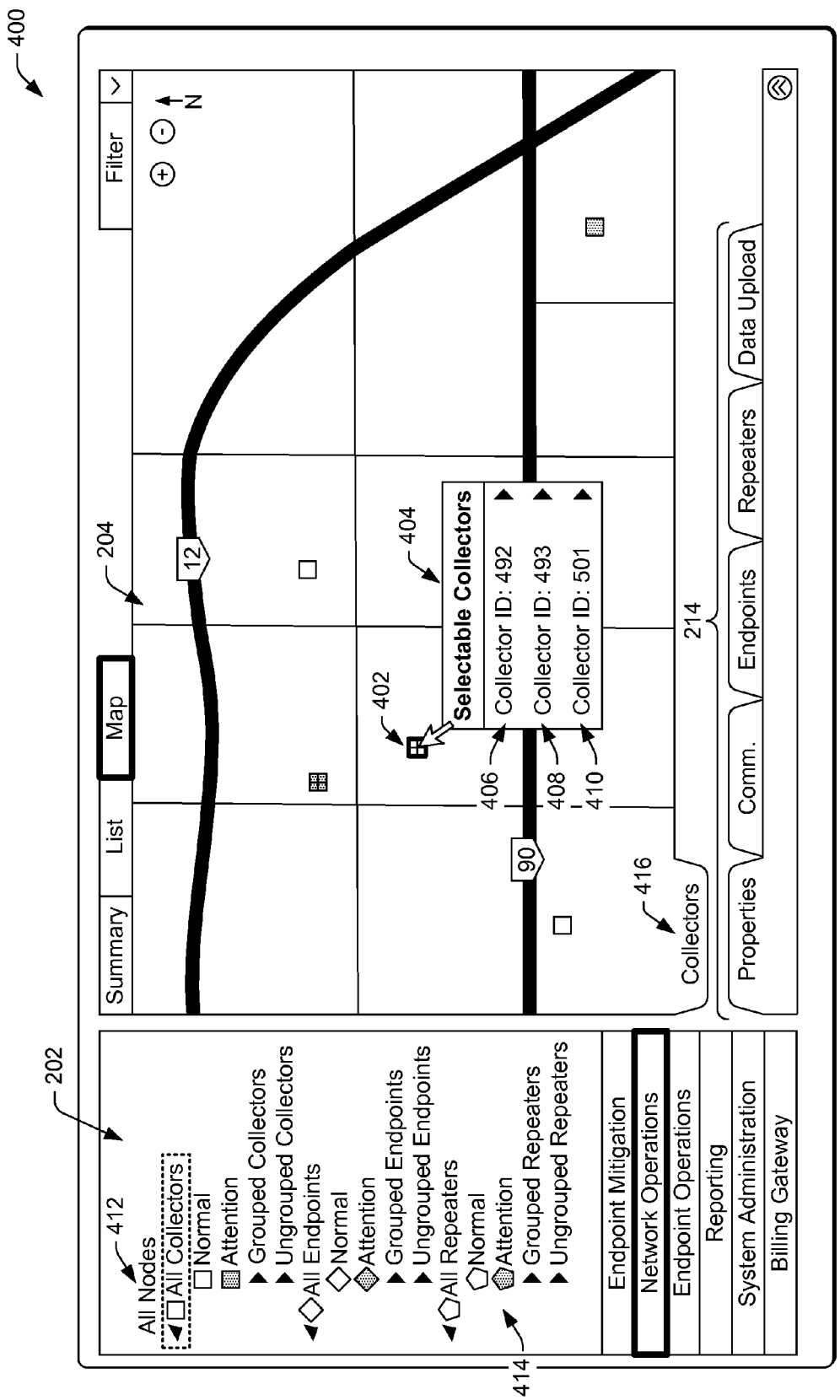
FIGS. 4A-4B illustrate example user interfaces for displaying a list of utility nodes in close proximity to a location of a selected icon.
Figure 4B:
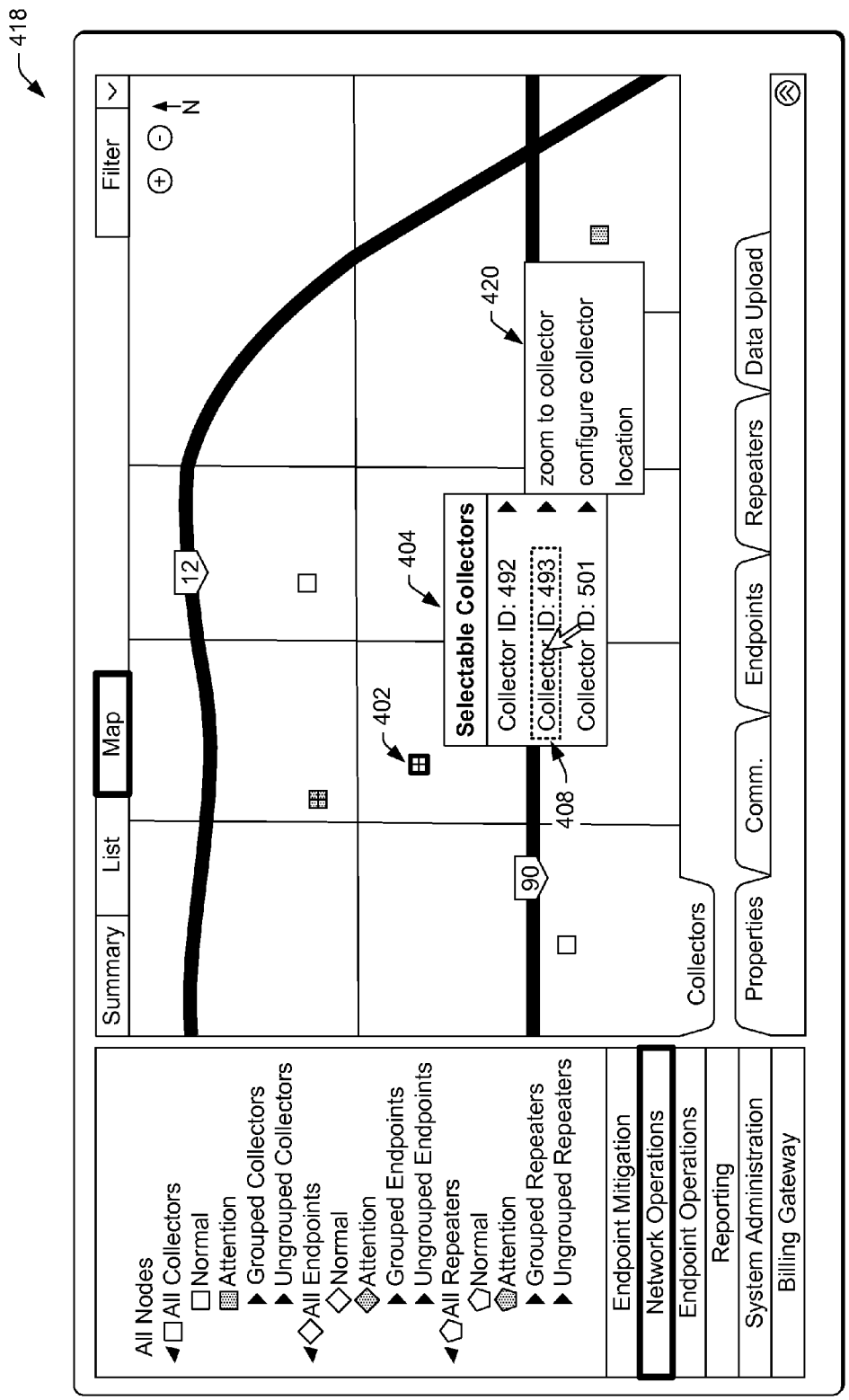

FIGS. 4A-4B illustrate example interfaces for displaying a list of utility nodes in close proximity to a location of a selected icon. In particular, in an interface 400 of FIG. 4A, an icon 402 has been selected by clicking on a particular input button (e.g., right/left clicking on a mouse), hovering over the icon 402, or otherwise selecting the icon 402. Upon selecting the icon 402, collectors associated with the icon 402 are displayed in a list in a window 404. The window 404 is overlaid on the map in close proximity to the location of the icon 402. In this example, the icon 402 is associated with collectors 406-410.

In the interface 400 of FIG. 4A, the navigation area 202 includes an option 412 to select "All Nodes" and options 414 to select repeaters (e.g., "All Repeaters," "Normal," "Attention," "Grouped Repeaters," and "Ungrouped Repeaters"). Here, the area 204 corresponds to "All Collectors," as illustrated by the "Collectors" tab 416 in the map view of the interface 400. In addition, the interface 400 includes tabs 214 that have been updated with information specific to collectors, such as a "Communication" tab, an "Endpoints" tab, a "Repeaters" tab, and a "Data Upload Log" tab.

FIG. 4B illustrates an example interface 418 that may be displayed upon selection of the collector 408 in the window 404 of FIG. 4A. The interface 418 may include a window 420 enabling an individual to perform an action, such as zooming in to the collector 408, configuring the collector 408, or displaying location information for the collector 408. As similarly discussed above for the window 308 of FIG. 3, the window 420 may alternatively or additionally enable an individual to perform other actions.

Example Process

Figure 5:
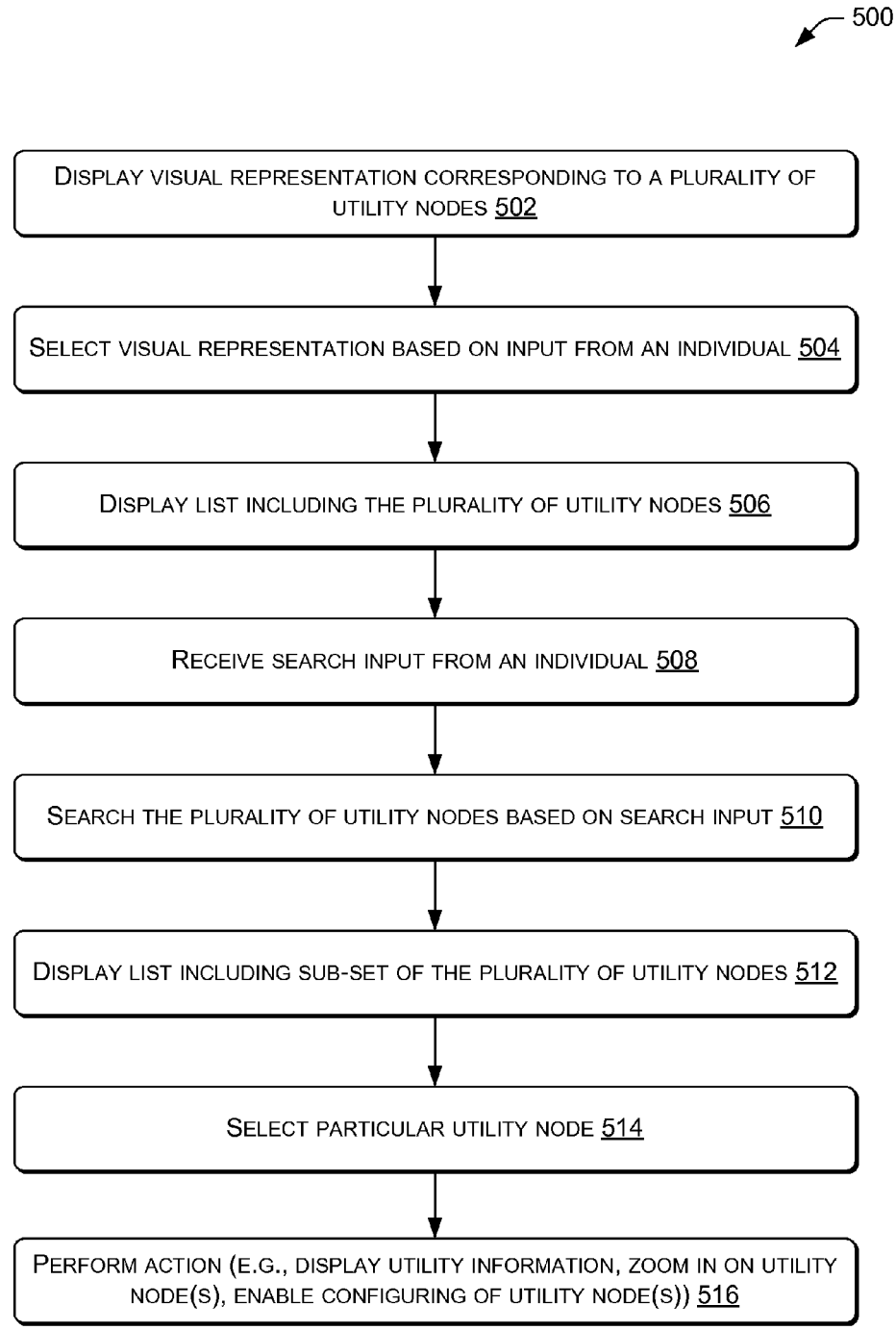
FIG. 5 illustrates an example process of displaying a visual representation corresponding to a plurality of utility nodes, selecting the visual representation, displaying a list including the plurality of utility nodes, selecting a particular utility node, and performing an action related to the particular utility node.

FIG. 5 illustrates an example process 500 for employing the techniques described herein. For ease of illustration process 500 is described as being performed in the architecture 100 of FIG. 1. For example, one or more of the individual operations of the process 500 may be performed by the device 102 and/or the service provider 108. However, process 500 may be performed in other architectures. Moreover, the architecture 100 may be used to perform other processes.

The process 500 (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 5 shows that at operation 502, an interface (e.g., the interface 200 of FIG. 2A) may be displayed with a visual representation (e.g., icon 210) corresponding to a plurality of utility nodes. At operation 504, the visual representation may be selected based on input from an individual. For example, the individual may use an input/output device (e.g., mouse, touch screen, etc.) to select the visual representation displayed on the interface.

At operation 506, a list may be displayed that includes the plurality of utility nodes associated with the visual representation. For example, the interface may be updated to display a list of endpoints, collectors, and/or repeaters in a window (e.g., the window 220 of FIG. 2A). The list may be displayed in response to selecting the visual representation in the operation 504.

At operation 508, search input may be received from an individual. The search input may include search terms and may be received through the interface. In the context of the example of FIG. 3, the search input may be received through the search area 302. At operation 510, the plurality of utility nodes of the list may be searched based on the search input (e.g., a particular search term(s)). The search may result in a list that includes a sub-set of the plurality of utility nodes of the list displayed in the operation 506. At operation 512, the list (e.g., search results list) including the sub-set of the plurality of utility nodes may be displayed. In some instances, the list of search results may be sorted based on an individual's selection of a particular column (e.g., in FIG. 3 the search results list may be sorted in either ascending or descending order depending on which column was clicked).

At operation 514, a particular utility node of the list displayed in the operation 506 or the list displayed in the operation 512 may be selected. For example, a particular utility node may be selected from a list that includes the plurality of utility nodes (e.g., the list displayed in the window 220 of FIG. 2A) or may be selected from a list that includes a sub-set of the plurality of utility nodes (e.g., the search results list displayed in FIG. 3).

At operation 516, an action may be performed related to the particular utility node selected in the operation 514. For example, the interface may display utility information related to the particular node, zoom in/out on the particular utility node, enable the particular utility node to be configured, and so on. In some instances, the utility information may be displayed through one or more tabs of the interface (e.g., the tabs 214 of the interface 200 in FIG. 2A).

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A computer-implemented method comprising:
   under control of one or more computing systems configured with specific executable instructions,
   displaying information of a plurality of utility node categories, the plurality of utility node categories including a first utility node category for endpoints and a second utility node category for data collectors;
   receiving a selection of a particular utility node category of the plurality of utility node categories, the particular utility node category comprising the first utility node category or the second utility node category;
   displaying, on a utility line distribution map that includes utility lines representing at least one of pipes or channels for gas, water, or electricity, a single icon representing a plurality of utility nodes that are associated with the particular utility node category, the single icon indicating that the plurality of utility nodes are represented by the single icon and indicating that an error has occurred at a utility node of the plurality of utility nodes, the error indicating loss of communication with the utility node over a predetermined time period;
   receiving a selection of the single icon at a location on the utility line distribution map where the single icon is displayed;
   at least partly in response to receiving the selection of the single icon, displaying a list including the plurality of utility nodes that are associated with the particular utility node category, the list being displayed at substantially the location on the utility line distribution map where the single icon is displayed;
   receiving a selection of a particular utility node from the list including the plurality of utility nodes;
   at least partly in response to receiving the selection of the particular utility node, displaying an option to configure the particular utility node;
   receiving information to configure the particular utility node; and
   configuring the particular utility node based at least in part on the received information.

2. The computer-implemented method of claim 1, wherein the plurality of utility nodes are located at a same location for a current zoom level on the utility line distribution map.

3. The computer-implemented method of claim 1, wherein the list including the plurality of utility nodes is displayed by overlaying the list on the utility line distribution map.

4. One or more devices comprising:
one or more processors; and
memory, communicatively coupled to the one or more processors, storing one or more modules executable by the one or more processors to perform operations comprising:
displaying information of a plurality of utility node categories, the plurality of utility node categories including a first utility node category for endpoints and a second utility node category for data collectors;
receiving a selection of a particular utility node category of the plurality of utility node categories, the particular utility node category comprising the first utility node category or the second utility node category;
displaying, on a utility line distribution map that includes utility lines representing at least one of pipes or channels for gas, water, or electricity, a single icon representing a plurality of utility nodes that are associated with the particular utility node category, the single icon indicating loss of communication with a utility node of the plurality of utility nodes over a predetermined time period;
receiving selection of the single icon at a location on the utility line distribution map where the single icon is displayed;
upon receipt of the selection of the single icon, displaying a list including the plurality of utility nodes, the list being displayed at substantially the location on the utility line distribution map where the single icon is displayed;
receiving selection of a particular utility node from the list including the plurality of utility nodes; and
based at least in part on the selection of the particular utility node:
displaying an option to configure the particular utility node;
receiving information to configure the particular utility node; and
configuring the particular utility node based at least in part on the received information.

5. The one or more devices of claim 4, wherein each of the utility nodes of the plurality of utility nodes corresponds to a node in an advanced metering infrastructure configured to receive and/or send resource consumption information.

6. The one or more devices of claim 4, wherein the displaying the single icon associated with the plurality of utility nodes includes displaying the single icon for the plurality of utility nodes which are located at a same location for a current zoom level on the utility line distribution map.

7. The one or more devices of claim 4, wherein the operations further comprise:
upon displaying the list including the plurality of utility nodes, receiving search input from an individual;
searching utility nodes of the plurality of utility nodes of the list based at least in part on the search input; and
displaying a list including a sub-set of the plurality of utility nodes based at least in part on the searching,
wherein the particular utility node that is selected comprises a utility node of the list that includes the sub-set of the plurality of utility nodes.

8. The one or more devices of claim 4, wherein the single icon associated with the plurality of utility nodes is displayed with information indicating that more than one utility node is associated with the single icon.

9. The one or more devices of claim 4, wherein the single icon associated with the plurality of utility nodes indicates whether or not a utility node of the plurality of utility nodes needs attention due to an occurrence of an error.

10. One or more non-transitory computer-readable storage media storing computer-readable instructions that, when executed, instruct one or more processors to perform operations comprising:
providing a user interface including a utility line distribution map and interface elements to enable selection of any of a plurality of utility node categories, the plurality of utility node categories including a first utility node category for endpoints and a second utility node category for data collectors, the utility line distribution map including utility lines for at least one of gas, water, or electricity;
receiving selection of a particular utility node category of the plurality of utility node categories, the particular utility node category comprising the first utility node category or the second utility node category;
based at least in part on the selection of the particular utility node category, providing a single icon on the map, the single icon being associated with a plurality of utility nodes that are associated with the particular utility node category, the single icon indicating that more than one utility node is associated with the single icon and indicating an error has occurred at a utility node of the plurality of utility nodes, the error indicating loss of communication with the utility node over a predetermined time period;
receiving selection of the single icon at a location on the utility line distribution map where the single icon is displayed;
upon receipt of the selection of the single icon, updating the user interface to include a list of the plurality of utility nodes, the list being displayed next to a location of the single icon on the utility line distribution map;
receiving selection of a particular utility node from the list of the plurality of utility nodes;
at least partly in response to receiving the selection of the particular utility node, displaying an option to configure the particular utility node;
receiving information to configure the particular utility node; and
configuring the particular utility node based at least in part on the received information.

11. The one or more non-transitory computer-readable storage media of claim 10, wherein each of the utility nodes of the plurality of utility nodes corresponds to a node in an advanced metering infrastructure configured to receive and/or send resource consumption information.

12. The one or more non-transitory computer-readable storage media of claim 10, wherein the operations further comprise
zooming in on the particular utility node.

* * * * *